United States Patent [19]
Lafuze

[11] Patent Number: 5,198,972
[45] Date of Patent: Mar. 30, 1993

[54] TURN-OFF SWITCH PHASE CONTROL WITH IMPROVED RIPPLE AND POWER FACTOR

[75] Inventor: David L. Lafuze, Waynesboro, Va.

[73] Assignee: The United States of America as represented by the Secretary of the Air Force, Washington, D.C.

[21] Appl. No.: 815,081

[22] Filed: Jan. 3, 1992

[51] Int. Cl.⁵ .......................................... H02M 5/257
[52] U.S. Cl. ..................... 363/138; 363/37; 363/45; 363/160; 323/207
[58] Field of Search ................ 363/37, 45, 46, 125, 363/127, 128, 135, 136, 138, 160–165; 323/207

[56] References Cited

U.S. PATENT DOCUMENTS

| | | | |
|---|---|---|---|
| 4,218,732 | 8/1980 | Lafuze | 363/160 |
| 4,567,552 | 1/1986 | Hirose | 363/87 |
| 4,589,059 | 5/1986 | Tanino | 363/49 |
| 4,648,022 | 3/1987 | Schauder | 363/159 |
| 4,777,581 | 10/1988 | Smith | 363/161 |
| 4,814,967 | 3/1989 | Broughton et al. | 363/160 |
| 4,833,588 | 5/1989 | Schauder | 363/160 X |

OTHER PUBLICATIONS

Textbook, *Rectifier Circuits: Theory and Design* by Johannes Schaefer, published by John Wiley and Sons in 1965.

*Primary Examiner*—Emanuel T. Voeltz
*Attorney, Agent, or Firm*—Gerald B. Hollins; Donald J. Singer

[57] ABSTRACT

An improved commutation arrangement for an AC to AC or AC to DC energy converter circuit is disclosed. The improved arrangement uses turn-off capable commutation switches to enable modification of the operating waveforms in the cycloconverter. The modified waveforms include an operating concept wherein in lieu of always switching to the next lagging phase (as is done with conventional cycloconverters), an intervening switch is made to the leading phase when the output voltage is less than one-half of the maximum value. The disclosure includes mathematical consideration of source machine power factor, output waveform ripple content, interphase transformer characteristics, engine starting usage, and other refinements of the commutation arrangement.

20 Claims, 5 Drawing Sheets

TURN-OFF SWITCH PHASE CONTROL WITH IMPROVED RIPPLE AND POWER FACTOR

RIGHTS OF THE GOVERNMENT

The invention described herein may be manufactured and used by or for the Government of the United States for all governmental purposes without the payment of any royalty.

BACKGROUND OF THE INVENTION

This invention relates to the field of electrical energy conversion circuits and to the improvements achievable therein using switching devices having both turn-on and turn-off capabilities.

Constant frequency alternating current energy is needed in modern aircraft, space vehicles and other transportation systems in what may be classed as moderate energy levels, levels falling in the range of one kilowatt to several hundred kilowatts of power, for example. Energy of this constant frequency nature is particularly needed for the operation of alternating current motors of the frequency responsive type such as induction and synchronous motors, and is also desirable in the optimization of transformers for maximum electrical capacity with minimum mass and space cost and in operating electronic equipment.

The need for electrical energy of this nature is, in fact, so intense as to have supported considerable prior art effort and a variety of approaches to its realization since the beginning of World War II, for example. These prior generation arrangements have included the use of a DC to AC rotating machine inverter, that is, a DC motor coupled to an alternating current generator; the use of constant speed separate prime movers or energy sources on the aircraft, i.e., rotating machine sources used solely for the purpose of generating electrical energy; the use of elaborate precision hydraulic transmissions by which a constant speed alternator can be driven from a variable speed engine; and to a limited degree, the use of variable frequency excitation in the rotating field of an alternator.

In more recent systems, systems accomplished since the advent of solid state electrical switching devices, the cycloconverter circuit has also been used to obtain this energy. In the cycloconverter an energy output waveform is fabricated from selected sample portions of higher frequency and often multi-phased input alternating current energy using a switching and possibly feedback controlled algorithm of sample generation. A related DC to AC form of this switching apparatus is commonly used in passenger bus lighting where fluorescent lamps are operated from a DC or battery source. A similar arrangement is also used in many of the battery energized portable fluorescent lantern devices employed by woodsmen and campers.

Although DC to AC inverters are related to the cycloconverter, the true cycloconverter may be thought of as an apparatus having both alternating current energy input and alternating current energy output and involving the use of input waveform sampling for fabricating or constructing the output waveform. In some cycloconverters, rectifier devices are employed in fabricating the alternating current output waveform. In yet another variation of the underlying concept, some such circuits are arranged to provide variable frequency output energy.

Previous cycloconverter arrangements have been somewhat hampered by the unavailability in the electronic switching device art of a moderate power level capacity electrical switching element that is capable of performing both turn-on and turn-off switching operations in response to low level control signals. As is well known in the electronic art most previously available switching devices such as silicon controlled rectifiers or thyristors have the characteristic of remaining in the on or conducting state, once triggered, until current flow is interrupted by some external means. Such characteristics are also common to previously used vacuum tube devices such as the thyratron, ignitron and grid controlled rectifier.

All of these solid state and vacuum tube switching devices therefore use an operating cycle wherein triggering is accomplished after some delay into the alternating current cycle and the resulting conduction interval is continued until interrupted at, for example, a zero voltage point of the alternating current sinusoid. In cycloconverter use this switching characteristic is less than optimum and often penalizes the cycloconverter operation, especially with respect to output waveform ripple and power factor of the load imposed on the source alternator or transformer supplying the cycloconverter energy.

As is disclosed subsequently herein, both the cycloconverter output waveform ripple and the source machine power factor characteristics can be improved upon through the use of switching or commutating elements which are controllable in both the on and off switching directions and especially through the use of a newly appearing class of Metal Oxide Semiconductor (MOS) switching elements of this type.

In airborne uses of the cycloconverter it is usually desirable to obtain an output waveform which is sinusoidal in nature and has a constant frequency of 400 Hertz or cycles per second and to source this energy from one or more alternators having an output frequency which ranges from twelve hundred to eighteen hundred Hertz or from sixteen hundred to thirty-five hundred Hertz, for examples, depending upon the aircraft and the engine designs involved. Generally in cycloconverter circuits it is desirable to maintain at least a three-to-one ratio between the lowest alternator output frequency and the cycloconverter output frequency. The twelve hundred to eighteen hundred cycles per second alternator output frequency range of the first instance above just meets this three-to-one ratio, for example, assuming a four hundred cycle per second cycloconverter output frequency.

It is also interesting to note that a cycloconverter may be arranged to provide either single Phase or multi-phased output energy while operating from either single-phase or multiple-phased input energy sources. The use of a multiple-phase input and three-phase output configuration in the cycloconverter is especially popular in view of the prevailing use of three-phase systems in airborne and ground energy supply systems. The well-known concept that three-phase distribution systems operate at optimum efficiency and three-phase energy convenience for motor and low ripple rectifier uses, for examples, also support this usage.

The prior patent art includes several examples of earlier inverter or cycloconverter circuit arrangements which are of general background interest with respect to the present invention. Included in these prior art patents is U.S. Pat. No. 4,567,552 issued to Syunichi Hirose et al which is concerned with a phase control device for a power converter having a feedback signal and an error signal control arrangement in the triggering circuitry of a controlled rectifier element.

Also included in this art is U.S. Pat. No. 4,648,022 issued to Colin Schauder which concerns an alternating current converter circuit employing bilateral switches that are arranged by groups of three bilateral switches connected respectively between each phase of the input alternating current source and one phase of the output alternating current wave conductors. The Schauder invention provides for a hidden DC link between the input and output conductors and a feedback controlled pulse width modulation algorithm which embodies a bang-bang technique for selecting the used sinusoid waveform portions. The Schauder patent also discloses the use of current sensing and the improvement of waveform quality through the use of an artificial thirty degree phase shifting arrangement that accomplishes reduction of the fifth and seventh harmonic content in the output waveform. The Schauder patent also contemplates the use of software in controlling commutating switch operation and envisions use of the invention in a variable frequency alternating current motor drive control. The Schauder patent also does not specify the employed turnoff switches, however, switch control by a gate signal appears to be desirable.

Also included in this prior art is U.S. Pat. No. 4,589,059 issued to Morihiko Tanino which concerns an arrangement for startup of a current-fed inverter having primary utilization as an induction heating power supply. The Tanino patent contemplates the use of artificial pulses for triggering thyristors until such time as the output current exceeds a latching current value in order to achieve a reliable and rapid startup of the inverter's operation.

While each of these prior art patents relates to an improved inverter operating arrangement, none of their disclosures envisions use of the input sinusoid wave sampling taught herein and in order to achieve improved output waveform ripple and improved energy source power factor. In addition, none of these prior art patents teaches the use of switching elements which can be controlled in both the on and off direction by way of a low level gate signal.

SUMMARY OF THE INVENTION

The present invention contemplates a switching arrangement in which a normal input sampling sequence involving commutation to the next lagging input phase is improved-upon by switching to the next leading input phase whenever the output waveform voltage is less than one-half of its maximum value—in order to improve the ripple content of the output waveform and also improve the power factor of the load applied to the energy source. The invention is applicable to DC power supplies and AC to AC cycloconverters and contemplates the use of turn-off switches in order to enable accomplishment of the invention.

It is therefore an object of the present invention to provide an improved AC to AC cycloconverter.

It is another object of the invention to provide an improved cycloconverter having a special usefulness in constant frequency aircraft alternating current energy sources.

It is another object of the invention to provide an improved phase controlled rectifier arrangement which may be used in DC power supplies.

It is another object of the invention to provide an improved switching arrangement which may be employed without modification of conventional converter high current circuitry.

It is another object of the invention to provide a switching arrangement which can advantageously employ the on and off switching characteristics of newly emerging solid state switching elements.

It is another object of the invention to provide a switching arrangement especially adapted to on and off switchable MOS gate control thyristors.

It is another object of the invention to provide a phase controlled converter circuit in which an intervening switch is made to the next leading input phase rather than always switching to the next lagging input phase in the operating sequence of the switching elements.

It is another object of the invention to provide a converter in which this alternate switching operation is used during some predetermined portion of the inverter's output waveform.

It is another object of the invention to provide a converter using this switching arrangement when its output voltage is less than one-half of its peak value.

It is another object of the invention to provide an inverter having improved power factor characteristics with respect to its input energy source.

It is another object of the invention to provide a converter arrangement which affords lower output waveform ripple in comparison with related similar circuits.

It is another object of the invention to provide a cycloconverter operating arrangement which is useful in a variety of single-phase and multiple-phased input and output configurations, including three input or output phases.

Additional objects and features of the invention will be understood from the following description and claims and the accompanying drawings.

These and other objects of the invention are achieved by the method for achieving improved source machine power factor and output energy waveform ripple from the commutating circuit of a power converter apparatus having on and off controllable switching elements and multiple phased energy input waveforms from the source machine, the method comprising the steps of; segregating the commutation operation of the switching elements into a first operating mode for generating input waveform samples contributing to a fabrication of large amplitude portions of the output waveform, and a second operating mode for generating input waveform samples contributing to a fabrication of small amplitude portions of the output waveform; selecting first operating mode commutation samples from the multiple phased input waveforms in the sequence of each phase sample being succeeded by a sample from the next lagging input phase, for fabricating the output waveform large amplitude portions; choosing second operating mode commutation samples from the multiple phased input waveforms in the sequence of each phase sample being succeeded by a first sample from the next leading input phase and then by a second sample from the next lagging input phase, for fabricating the output waveform small amplitude portions.

DETAILED DESCRIPTION

Figure 1:
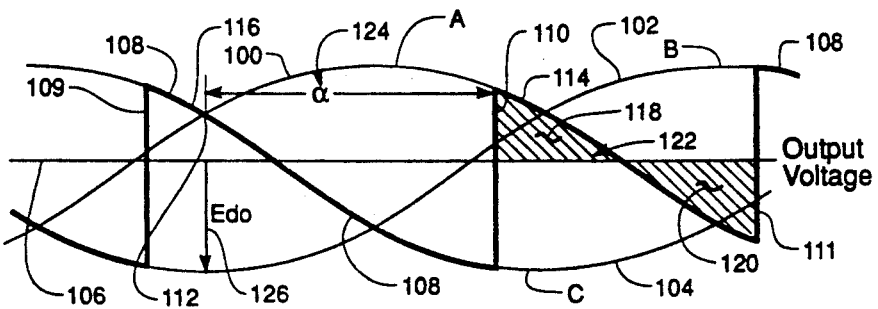
FIG. 1 shows the waveform sampling operation of a conventional phase controlled rectifier circuit.

FIG. 1 in the drawings shows representative waveforms for a three-phase energy source that is connected with a conventional phase controlled rectifier or cycloconverter or converter. In the FIG. 1 drawing the three sinusoids representing the A, B, and C phases of the converter input energy are shown at 100, 102 and 104 respectively, with the output energy waveform (appearing as a zero amplitude straight reference line for these phases) being indicated at 106 and with the input waveform portions which actually contribute to this converter output being indicated at 108. The output waveform portion at 106 in FIG. 1 can be actually a portion of a sinusoid waveform, however, if this output sinusoid is of significantly lower frequency than the sinusoids shown at 100, 102, and 104, the output sinusoid at 106 appears as a straight line in the FIG. 1 drawing. As indicated below, an exemplary frequency ratio of at least twelve to one prevails between the sinusoids 100 and 106.

The phase-to-phase switching or commutating transitions comprising part of the waveform 108 are indicated at 109, 110 and 111 in the FIG. 1 drawing. The output waveform portions 108 in FIG. 1 also includes the sinusoidal segment portions 114 and 116 and a similar (not shown) portion of the sinusoid 102 which are recurring all along the waveforms 100, 102, and 104. The sinusoidal segments such as the segment 114, together with the lines 106 and 110, form a triangular shaped enclosed area 118 which is positive or above the line 106 and a related negative area which is indicated at 120. Synchronized movement of the phase-to-phase transitions 109, 110 and 111 and the resulting complementary increase and decrease in the areas 118 and 120 is of course, presumed in operating a converter according to the FIG. 1 waveforms.

The positive and negative area portions 118 and 120 in FIG. 1 are of approximately equal size with respect to their enclosed area and thereby represent a converter operating condition in which little output energy is being delivered. Therefore, energy flowing into the converter's load during the positive going area 118 is extracted or withdrawn from the load during the negative area portion 120—assuming the load is composed of reactive elements which are capable of receiving and returning energy.

It may be observed in FIG. 1 therefore, that if the phase-to-phase transition lines 109, 110, and 111 are moved either to the right or to the left then the relative sizes of the triangular areas 118 and 120 are rapidly changed. A rightward movement of the line 110, for example, decreases the area 118 and the corresponding rightward movement of the line 111 increases the area 120. The horizontal position of the lines 109, 110, and 111 may therefore be used in controlling the net output from the FIG. 1 represented converter. The crosshatching indicated at 122 is used to emphasize the output determining areas 118 and 120.

By convention in the phase control art, the Greek letter alpha or $\alpha$ as indicated at 124, is used to indicate the angular position of the phase-to-phase transition 110 with respect to a reference point on the sinusoid waveforms. As is indicated in FIG. 1, this reference point is usually taken to be the intersection of two sinusoids—indicated at 112 in FIG. 1. The angle $\alpha$ is therefore understood to define the location of the phase-to-phase transition or the firing point of the electrical switching devices by which a circuit path between the sinusoid 104 and the converter's output terminal is ended and between the sinusoid 100 and the converter's output terminal is established.

The FIG. 1 converter operating sequence is conventional in nature in that the phase-to-phase transition 111 represents commutation from the A phase to the B phase, the transition 110 represents commutation from the C phase to the A phase and the line 109 represents commutation from the B phase to the C phase. Viewed in perspective therefore, assuming the phase sequence of A, B, C, each of these transitions represents commutation from a given phase to the next lagging phase in formulating or building the output waveform of the converter. According to conventional converter practice, therefore, this commutation to the next lagging phase is employed for all amplitude relationships between the converter input and output waveforms with control of the output magnitude being exercised by way of changing the angle $\alpha$. In this arrangement, a decrease in the angle $\alpha$ from the FIG. 1 illustrated zero output position results in greater positive output from the converter, and an increase in the angle $\alpha$ beyond 90° provides greater negative output or inverted output from the converter.

NORMAL CONTROL PLUS TURN-OFF STOP

In FIG. 1 therefore, the output amplitude is controlled by turning a switch on at some angle α after the line-to-line difference voltage of zero, the reference point at 112. The converter's output in FIG. 1 is maximum with no retard—or when the angle α is zero. With ninety degrees of retard, as approximately shown in FIG. 1, the average output is zero, and with one hundred eighty degrees of retard, the output is maximum negative or full inversion. Commutation in the FIG. 1 converter waveform is said to be "natural" since current prefers to flow from the most positive input generator or alternator voltage, and turning on a more positive phase shuts off a previously conducting phase—because current wants to flow from the more positive voltage of the oncoming phase back against the blocking characteristic of the off going phase's switch.

At large phase retard angles in the FIG. 1 converter, however, natural commutation becomes unreliable since there must be enough volt-second area under the post-commutation portion of the curve to force the current to zero in the source inductance, plus enough time after the current is extinguished for the off going switch to recover its voltage blocking ability before the line-to-line voltage reverses at an α angle of one hundred eighty degrees.

In voltage switched cycloconverters the maximum retard angle for achieving reliable commutation is found to be in the order of one hundred thirty-five degrees. This is a result of the relatively high commutating inductance of a weight minimized energy sourcing machine and because of commutating notches caused by the loading of other output phases sometimes taking away the voltage which appears to be available for commutation. This commutation limitation means that the maximum voltage available during inversion operation of the FIG. 1 converter, when the output voltage polarity is reversed from the normal direction, is only slightly greater than seventy percent of that possible in the rectifying polarity. This in turn means that there is a major machine rating penalty required to insure commutation while the converter is meeting the industry standard overload requirement of two per unit at 0.7 power factor.

If however, the employed commutating switch has turn-off capability as is considered herein, then full retard operation of the FIG. 1 converter is practical. In such operation, a turn-off gate pulse is always applied at an angle α of three hundred degrees. Another way of stating this is that a turn-off gate pulse is always applied to the preceding phase at an angle α of one hundred eighty degrees, as is the case shown in FIG. 1. Only minimum turn-off capability is required of the switch in such operation since forced turn-off is attempted only when the voltage across the switch is near zero and in most instances the turn-off has already been accomplished by an earlier natural commutation.

Such forced commutation allows a reduction of the machine terminal voltage by approximately fifteen percent because of the lessened commutation requirement and enables an additional reduction of the machine's internally generated voltage, since the lower terminal voltage increases the displacement power factor of the machine. Reduced machine voltage also reduces the ripple voltage to be filtered and the voltage which an interphase transformer must withstand, which gives a further weight savings that is especially desirable for airborne apparatus.

For a converter operating according to the FIG. 1 waveform, the maximum output $E_{do}$ with no phase retard is found by integrating the machine voltage, whose RMS value is E, from thirty to one hundred fifty degrees; at one hundred fifty degrees the succeeding phase takes over.

$$E_{do} = \frac{\sqrt{2E}}{2\pi/3} \int_{30}^{150} \sin\theta \, d\theta \qquad (1)$$

$$= \frac{3\sqrt{3E}}{\sqrt{2\pi}} = 1.17E$$

Output voltage $E_d$ as a function of the retard angle is found by integrating from one switching point to the next.

$$E_d = \frac{\sqrt{2E}}{2\pi/3} \int_{30+\alpha}^{150+\alpha} \sin\theta \, d\theta \qquad (2)$$

$$= \frac{3E}{\sqrt{2\pi}} \{\cos(150 + \alpha) - \cos(30 + \alpha)\}$$

$$= E_{do} \cos\alpha$$

IMPROVED CONVERTER

Figures 2, 3, 4:
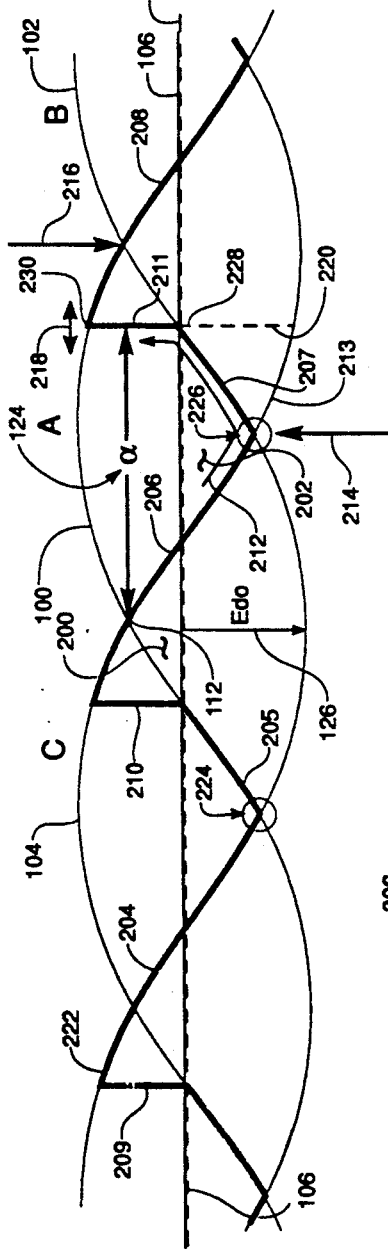
FIG. 2 shows a three-phase controlled rectifier circuit operating according to the present invention.
FIG. 3 shows a sinusoidal output wave formed by the FIG. 2 present invention circuit operation.
FIG. 4 shows waveforms relating to the operation of a six-phase sourced embodiment of the invention.

FIG. 2 in the drawings shows an improvement in the FIG. 1 converter waveforms which may be shown to be especially useful in the case of converter output waveform portions that are of lower amplitude. Converter output portions which are below one-half of the output peak value are for example, especially benefitted by the FIG. 2 waveform arrangement. In the FIG. 2 converter waveform the numbers used in describing the FIG. 1 waveform are repeated for FIG. 1 and FIG. 2 similar portions to the greatest degree possible. Additional numbers in the 200 series are used for newly appearing details in the FIG. 2 drawing.

In the FIG. 2 converter waveforms, the input wave portions which are commutated to the converter output are indicated by the heavy line emphasis shown at 222. This emphasized waveform is composed of the phase-to-phase commutations indicated at 209, 210, and 211 together with the input sinusoid portions 204, 205, 206 and 207. The emphasized wave 222, or more concisely, the waveform 222, of course, continues to the left and right of the small segment shown in FIG. 2. The areas enclosed by the waveform form 222 contribute to an output wave 106 in the manner described above for FIG. 1. Since the positive area 200 is somewhat larger than the negative area 202, the net output average value 106 is shown in FIG. 2 to be slightly positive with respect to the zero reference 201.

A notable difference between the FIG. 1 and FIG. 2 waveforms is the absence of the phase-to-lagging phase commutating event portion indicated at 220 in FIG. 2 and the presence of the waveform portion 207 in lieu of this absent portion. In accordance with the present invention therefore, the input sinusoid portions at 205 and 207 represent commutations at 224 and 226 to the leading phase prior to the commutations at 210 and 211 to the lagging phase and are accomplished in order to achieve a significant improvement in converter operation.

The FIG. 2 waveform represents a basic commutation change in that instead of always switching to the next lagging phase in a commutating sequence as is done in FIG. 1 conventional converter phase control, an intervening switch is made to the leading phase when the converter is operating with the output voltage less than one-half its maximum value. In the FIG. 2 waveform such operation is achieved as the phase B switch is turned on when the phase C and B voltages cross at 226—if rectifying at low output voltage.

To describe this concept in more detail, the following paragraphs make reference to the waveform changes occurring with several different values of the angle $\alpha$. For readers not familiar with sinusoidal waveforms and their angular relationships, it may be helpful to realize that the half sinusoid portion of the phase C waveform, that is, the phase C waveform portion between two successive intersections of the C waveform with the zero axis line 201, corresponds to an angle of one hundred eighty degrees, and the sinusoid portion between a zero axis intercept and a sinusoid peak value represents an angle of ninety degrees, and so on. In accordance with this "measuring scale", the angle $\alpha$ shown in FIG. 2 is therefore about ninety degrees in size.

In the improved FIG. 2 converter, the transfer from the C to B phases shown at 226 occurs naturally as the oncoming B phase has a higher voltage immediately after the transition point 226. Natural commutation occurs again when the A phase switch operating at the point 230 turns on, as long as the angle $\alpha$ is substantially less than one hundred twenty degrees. The transfer from B to A phase at 230 must however, be insured by turning the B phase switch off at the point 216, especially for angle $\alpha$ values of greater than the ninety degrees shown in FIG. 2. Turn-off duty for the phase B switch at point 216, if natural commutation has not been completed, is minimal because the phase A and B voltages are equal.

Phase A is switched on at 230 in FIG. 2 sometime before $\alpha$ is one hundred twenty degrees in size if a finite output voltage is desired from the FIG. 2 waveforms. With an $\alpha$ of one hundred twenty degrees, the FIG. 2 waveform output voltage is zero and the waveshape is triangular and has about half of the ripple volt-seconds achieved in the output wave of the FIG. 1 normal control mode. For a six-phase system according to the FIG. 1 concept, the ripple of the diametric phases at zero output voltage are exact complements so there is no ripple at the output. There is also no output ripple for a three-phase double way (bridge) system at zero output.

For increased output voltage from the FIG. 2 waveform, the switching angle $\alpha$ is decreased from the illustrated one hundred ninety degree value. Also, when $\alpha$ is less than sixty degrees at the point 226 for example, the transfer from phase C is directly to phase A as it is for conventional programming. Such commutation is used in FIG. 2 whenever the output waveform voltage is less than half its maximum value. This exclusion of the phase B sinusoid portion 207 and direct commutation from phase C to phase A at $\alpha$ values of sixty degrees and less as commences at the transition point 226 in FIG. 2 in fact represents the transitions from output values less than one-half of the output peak, to output values greater than one-half of the output peak, as is referred to in the concise descriptions of the present invention in this disclosure. As may be appreciated from the FIG. 2 waveforms, this less than one-half of peak to more than one half of peak transition occurs smoothly. With decreasing alpha this transition in essence represents a *choice* of the sinusoid portion 207 in preference to the sinusoid portion 213 at the transition point 226. The arrow 212 in FIG. 2 therefore represents the desired commutation path sequence according to the invention.

As a matter of circuit convenience, a routine and uninhibited ON gating of the phase B switch at the point 226 even when alpha angles of sixty degrees and less prevail in FIG. 2 may be provided by the thyristor control circuits used in embodying the FIG. 2 waveforms. Omitting the circuits that exclude such gating in fact, offers a control circuit simplification. Such an ON gating is actually irrelevant because the phase B voltage is lower than the voltage on either phase A or C, as can be observed in FIG. 2, and no transfer to B will take place with such gating. It may however, be desirable to discontinue the gate pulse to the phase B switch if it increases the leakage of the switch as it would with a silicon controlled rectifier (SCR) device used for switching.

The arrows 214 and 216 are used to indicate the location of certain significant events or boundaries in the possible changes of the angle $\alpha$ in the FIG. 2 waveforms. The arrow 216, for example, represents the last point where phase B can conduct and therefore a location where a turnoff pulse is applied to the phase B switch when the output is positive and less than half maximum.

If the output voltage is negative but less than half maximum, although the current is positive (i.e., the circuit is inverting in rectifier terminology, a condition which means the area 202 in the FIG. 2 waveform is larger than area 200), then the phase A switch is always turned on at point 216. This is analogous to the turning on of the phase B switch at transition point 226 when the output is positive and less than half maximum.

When the output is negative and more than half maximum, the phase A switch is turned on at a location phased further beyond the arrow 216 for increasingly larger negative output voltage; this results in a direct transfer from phase C to phase A. In other words, the conventional operation of FIG. 1 is resumed. When inverting at less than half maximum voltage, the phase B switch is retarded from location at the arrow 214. This is equivalent to advancing the firing of the phase A switch from point 216 for increased positive output. When inverting at near maximum negative voltage, a turnoff signal should be applied to the phase B switch at point 214 to insure transfer to phase C, as was previously explained above with respect to the normal mode of operation and $\alpha$ angles of three hundred degrees.

It should be noted that the turn-off stop signal at the location of the arrow 216 interferes with turning on a phase B switch for maximum positive output and likewise the turnoff stop at arrow 214 interferes with the transfer to phase B for low positive inputs. The control circuits should therefore apply the appropriate switch firing stop as a function of output polarity and amplitude. Since there is a large change in converter output levels between locations where the stops are required and where they must be removed, this is not a burdensome requirement on the control circuitry.

By inspection of FIG. 2, the output voltage can be seen to be Proportional to the integral of the line-to-line voltage from the angle of one hundred twenty degrees diminished by $\alpha$ to the angle of 0.

$$E_d = \frac{E\sqrt{2}\sqrt{3}}{2\pi/3} \int_{120-\alpha}^{0} \sin\theta \, d\theta \quad (3)$$

$$= E_{do}\{1 - \cos(120 - \alpha)\}$$

$$= E_{do}\{1 - \sin(\alpha - 30)\}$$

The cost of accomplishing phase control according to the present invention is primarily related to control complexity. There is no change required in the power circuit of a converter using the invention and only a moderate increase in switching loss and source impedance occurs, these being due to the added switching events. Turn-off duty for the switches is minimal because when turn-off is required, low switching voltage is involved.

Figure 6:
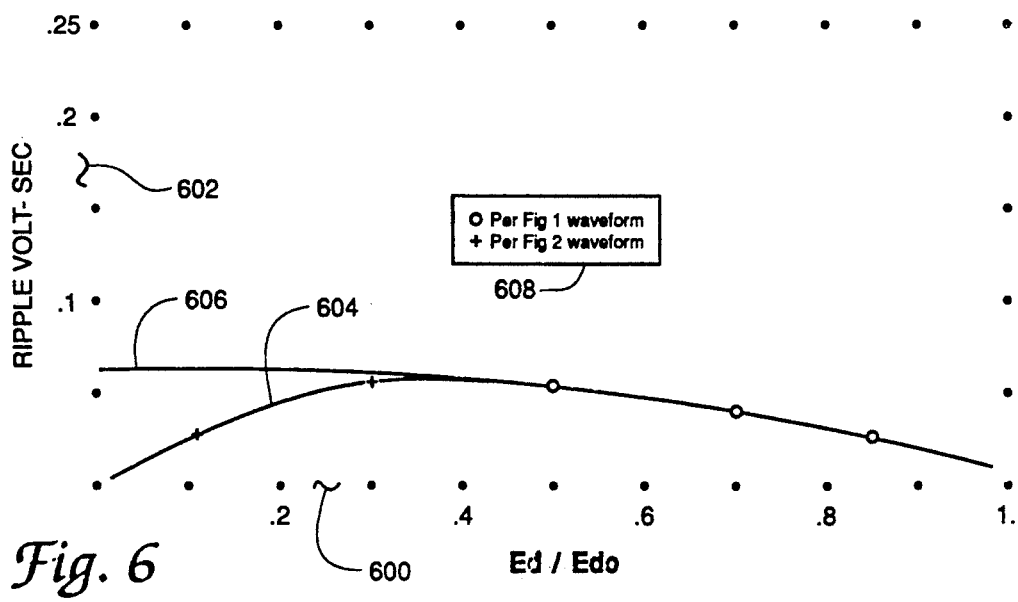
FIG. 6 shows the relationship between ripple volt-seconds in per unit of machine phase volt-seconds, vs. output for a six-phase, with interphase, transformer converter arrangement.
Figure 7:
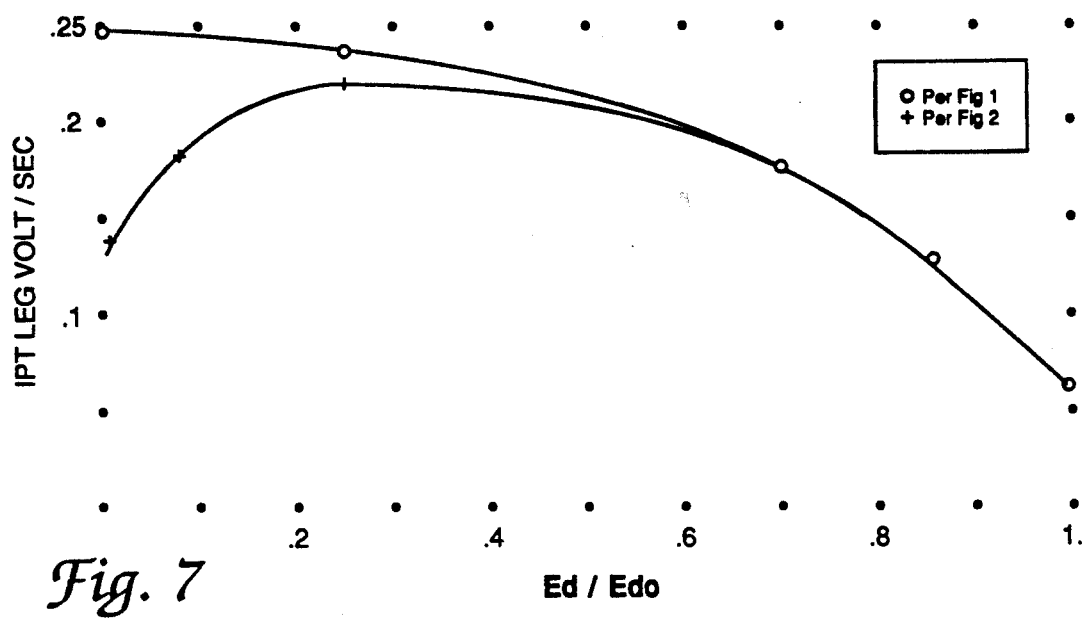
FIG. 7 shows interphase transformer leg volt-seconds in per unit of machine phase volt-seconds vs. output.

To further illustrate the concept of the invention, FIG. 6 and FIG. 7 respectively show a full output cycle program for the positive polarity switches of a three-phase embodiment of the invention and a six-phase embodiment or three-phase double way embodiment which uses interphase transformers.

RIPPLE VOLTAGE

Low ripple "modulation" in a converter output wave is desirable so that a minimum of filtering is required to obtain a smooth sinusoid or other selected output waveform. Filtering also adds cost in the nature of increased size, weight, power loss, and increased output impedance. In addition, ripple current increases both machine root mean square (RMS) and reactive currents and complicates commutation problems in naturally commutated converters. The use of a turn-off switch in a converter as considered herein however, largely eliminates commutation problems as a ripple consideration.

The considered ripple is the total of ripple volt-seconds in per unit measurement of the machine phase volt-seconds. The principal ripple frequency occurs at a frequency of the source machine's frequency times the number of machine phases. Ripple at the converter's output using a given filter can be conservatively estimated by assuming all the ripple volt-seconds are at this principal ripple frequency. FIG. 1 herein also shows an example of how the ripple volt-seconds may be calculated by integrating the area identified with the cross-hatching 122, the area between the input phase sinusoid wave 114 and the output wave portion 106.

Figure 5:
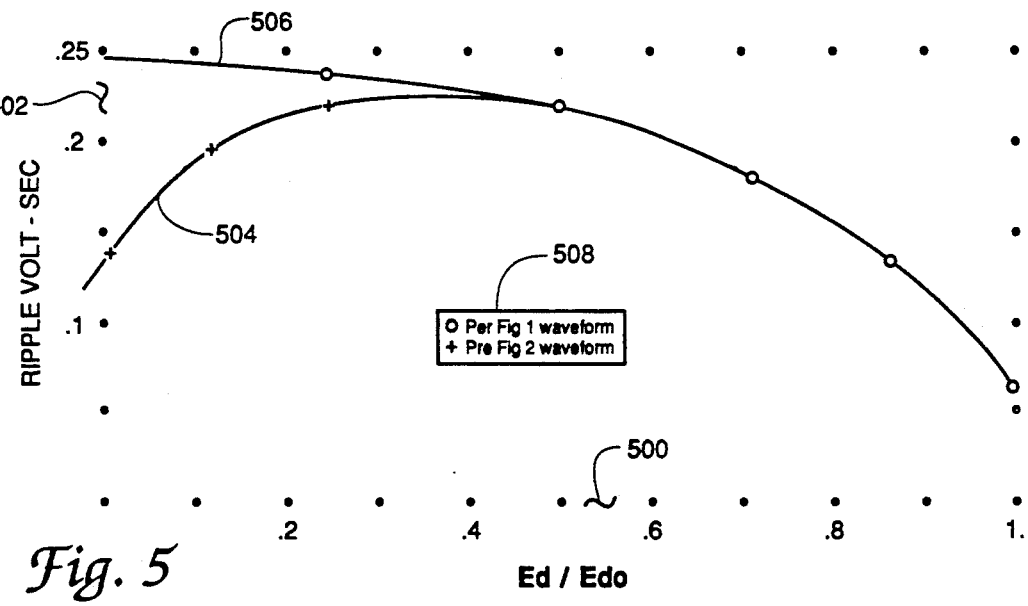
FIG. 5 shows the relationship between ripple volt-seconds in per unit of machine phase volt-seconds vs. output for a three-phase converter circuit.

The results of such ripple volt-seconds vs. output determinations are shown in FIG. 5 for the three-phase and in FIG. 6 for the six-phase with interphase transformer or three-phase double way (bridge) circuits. Each of FIG. 5 and FIG. 6 shows separate curves for the FIG. 1 and FIG. 2 switch operating arrangements. In FIG. 5 the curve 506 relates to the FIG. 1 commutation arrangement and the curve 504 to the FIG. 2 commutation arrangement with the curves 506 and 504 merging at an $E_d/E_{do}$ value of about 0.5. Similarly in FIG. 6, the curve 604 relates to the FIG. 2 commutation and the curve 606 to the FIG. 1. These relationships are also indicated in the legend boxes 508 and 608.

The present invention switching arrangement has no ripple at zero output voltage in the six-phase configuration because the three-phase groups of which it is composed have identical ripple waves one hundred eighty degrees out of phase. The vertical scales 502 and 602 in each of FIG. 5 and FIG. 6 represent ripple volt-seconds in per unit of machine volt-seconds while the horizontal scales 500 and 600 show the output voltage ratio $E_d$/$E_{do}$ for three-phase and six-phase circuits, respectively. The voltage $E_d$ represents the instantaneous output voltage and the voltage $E_{do}$ the maximum possible output voltage.

INTERPHASE TRANSFORMER VOLT-SECONDS PER LEG

Converters are often composed of switch banks which are paralleled through interphase transformers (IPTs). Such an arrangement serves to average the individual instantaneous voltages of the switch banks in determining the ripple characteristics of a converter composed of the total number of machine phases. Such arrangements also have the desirable longer conduction period of the lower phase number individual bank and the low output impedance of paralleled banks.

Each leg of an interphase transformer used in these circuit arrangements must withstand the voltage difference between the system output and the individual rectifier bank output. This voltage in per unit of machine phase volt-seconds is plotted in FIG. 7. The present invention control arrangement has the advantage of saving about eight percent in IPT leg voltage rating compared to the FIG. 1 control method.

EQUALIZING VOLT-SECONDS

If both positive and negative polarity switches are fired throughout the output wave, as occurs in the circulating current mode of operation of a cycloconverter, the instantaneous voltage of the positive switch bank may sometimes be more positive than that of the negative bank if both banks are arranged for the same average output voltage. When this occurs, current circulates from the positive to the negative bank, as is shown by the current flow 800 in FIG. 8, without passing through the load. When the instantaneous voltage reverses, the amplitude of the circulating current is forced down and the normal blocking characteristics of the switches prohibit reversal of the circulating current.

Some circulating current can be desirable since it helps smooth the conducting transitions between switch banks—since it keeps both banks conducting and the output becomes the average of both banks. The most desirable situation is to have a small circulating current flowing at all times. Other than smoothing the transition between switch banks however, circulating current is undesirable in that it increases the RMS and reactive currents in the machine and thereby the machine size and may impede commutation for naturally commutated converters.

Figure 8:
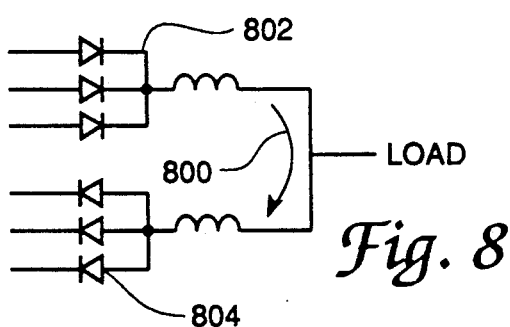
FIG. 8 shows the circulating current path which may exist in a three-phase cycloconverter arrangement of the invention.
Figure 9:
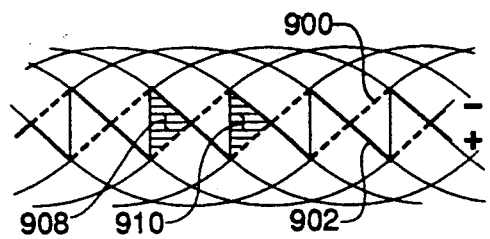
FIG. 9 shows the waveform of equalizing voltage transients in a FIG. 1 commutating circuit arrangement assuming a ninety degree retard of the firing angle, alpha ($\alpha$).

FIG. 9 in the drawings shows how the equalizing voltages in a six-phase with IPT cycloconverter system relate to the individual phase voltages in a FIG. 8 type of circuit. In FIG. 9, the solid line depicted waveform 902 represents voltage originating in the positive rectifier bank 802 in FIG. 8 and the dotted line waveform 900 represents voltages originating in the negative rectifier bank 804. Equalizing current builds up because of the hatched area volt-seconds 908 and 910 in FIG. 8 wherein the positive bank voltage 902 exceeds the negative bank voltage 900. The equalizing current decreases when the negative bank voltage is more positive than that of the positive bank. Current is limited by the inductance of the IPT and that of the power source.

Figure 10:
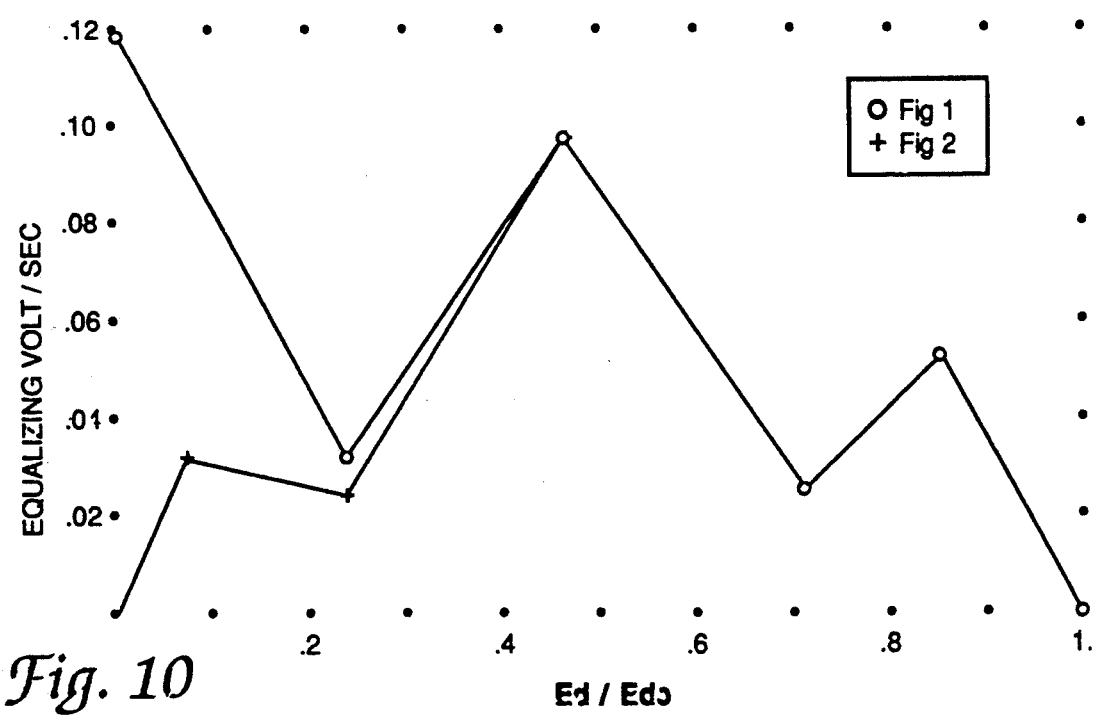
FIG. 10 shows the relationship between the equalizing volt-seconds in per unit of machine phase volt-seconds vs. output for two types of cycloconverter operation.

FIG. 10 shows the equalizing volt-seconds as a function of output voltage for the FIG. 1 and FIG. 2 types of commutation when arranged as six-phase circuits.

The FIG. 2 improved control method of the present invention avoids the peak equalizing volt-second point at zero output of the conventional control, yet retains the high point at one-half output.

MACHINE DISPLACEMENT POWER FACTOR

Phase retard operation of the FIG. 1 conventional cycloconverter imposes a low and lagging displacement power factor on the input source or alternator supplying the cycloconverter regardless of the load power factor. This in turn imposes a substantial size and weight penalty on the source machine—in order to provide the increased machine rating and supply the added reactive power required by such phase retard operation. Modifications of the cycloconverter which can improve the displacement power factor, is disclosed herein and in FIG. 2, are therefore capable of minimizing the size and weight of the alternator or transformer used to energize a cycloconverter.

The classic German technical paper "The Controlled Converter" by Jurgen Von Issendorf, which appears in Wiss. Ver. aus den Siemen-werken, Vol. 14, pt 3, pp 1-31, 1935, is hereby incorporated herein by reference. This paper describes the significance for cycloconverters of the high frequency system displacement power factor as a function of load system power factor and modulation factor—or the commutation selected fraction of the cycloconverter's possible output voltage.

Figure 11:
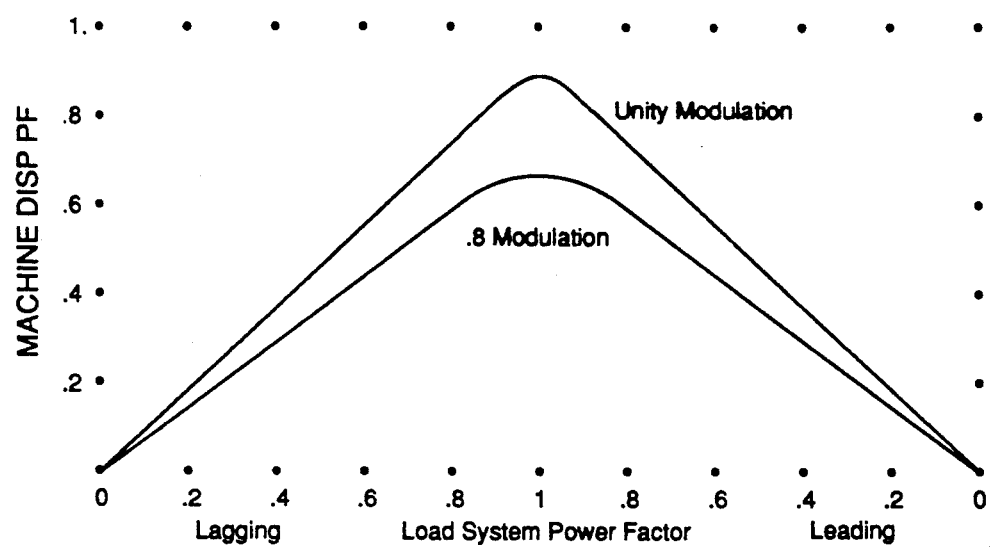
FIG. 11 shows the relationship between machine displacement power factor and load system power factor for a FIG. 1 type of conventional cycloconverter.

Generally, according to Von Issendorf, displacement power factor is the power factor of the fundamental component of current or a formal reckoning of the degree to which a cycloconverter's current and voltage waveforms are coincident or commonly centered about an axis. FIG. 11 shows Von Issendorf's results for 0.8 and unity modulation factors. For military aircraft use, the point which sets the machine rating is a double load at 0.7 power factor as is specified by MIL STD 23001.

On and off controllable switches and their enabled forced commutation allow unity or possibly higher degrees of modulation to be used as compared with the 0.9 or lower degree of modulation required to successfully commutate converters with one way or SCR switches. This results in a substantially reduced source machine, since the machine terminal voltage can be lowered by ten to fifteen percent and the internally generated machine voltage lowered even more because of the improved power factor at the higher modulation at this rating limit point.

Von Issendorf's method for determining the displacement power factor is to compute the reactive power as a function of instantaneous output voltage and load current, keeping in mind that the reactive power is always lagging regardless of the load system power factor imposed by the phase retard method of operation. This reactive power is averaged by integrating over a half cycle of the output frequency. The real machine power, neglecting losses, is the real load on the output. The displacement power factor is then:

$$P_f = P_r/(P_r^2 + P_x^2)^{\frac{1}{2}} \tag{6}$$

where
$P_f$ is the displacement power factor
$P_r$ is the real power
$P_x$ is the reactive power.

Figure 12:
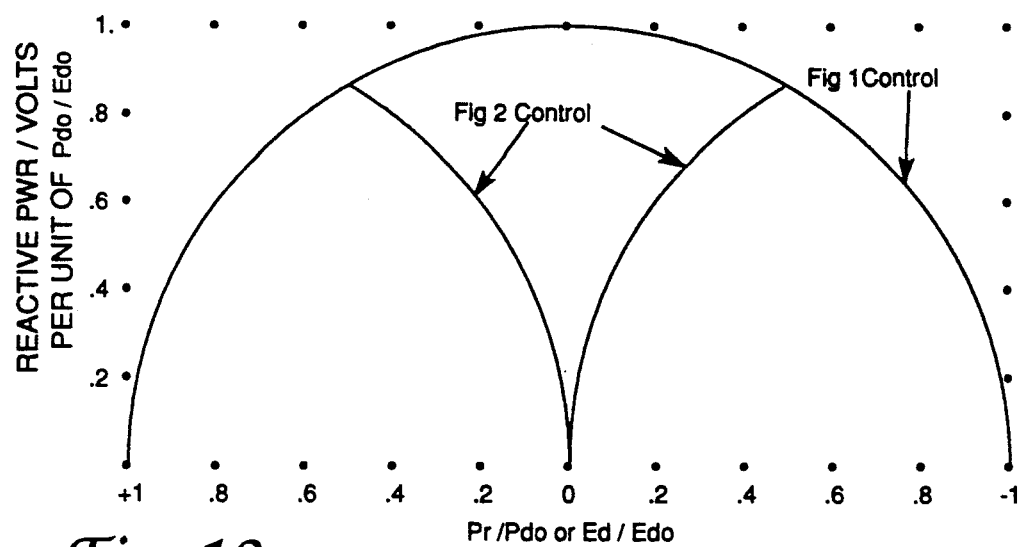
FIG. 12 shows the relationship between reactive power or voltage and output voltage for two types of converter commutation.

The textbook, *Rectifier Circuits: Theory and Design* by Johannes Schaefer, published by John Wiley & Sons in 1965 (which is hereby incorporated by reference herein) shows in chapter 19 derivation of the reactive power voltage as a function of output voltage for regular cycloconverter operation. These results are shown in FIG. 12. Schaefer's procedure enables the derivation of the reactive power voltage as a function of output for the FIG. 2 control method.

Figure 13:
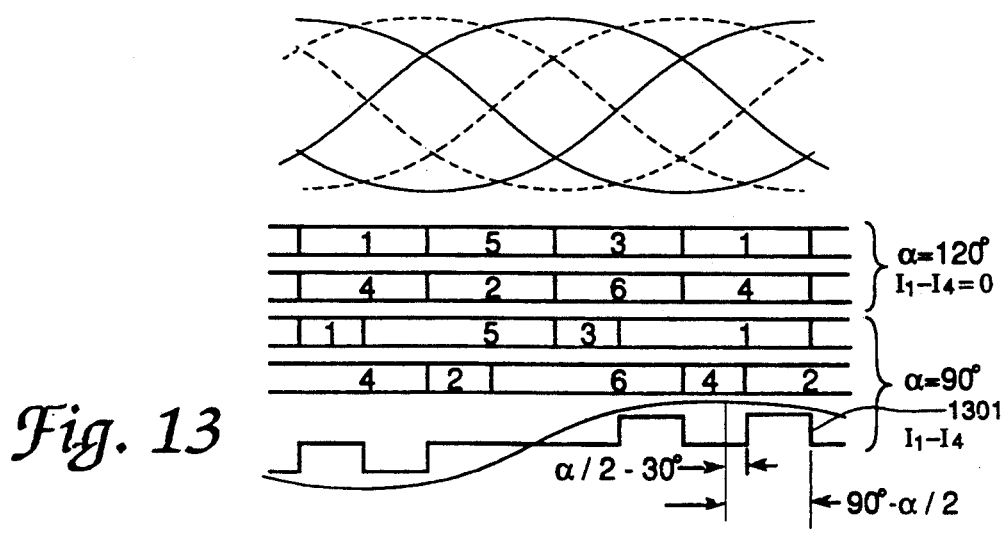
FIG. 13 shows the nature of energizing machine currents for a variety of differing cycloconverter modulations and firing angles.

FIG. 13 shows the machine currents at control angles $\alpha$ of ninety and one hundred twenty degrees. At an $\alpha$ angle of one hundred twenty degrees, machine currents flow for sixty degree intervals for the FIG. 2 cycloconverter. The diametric phase currents are coincident in this instance; i.e., so far as the machine excitation requirement is concerned, no current is flowing, since diametric phase currents of the same polarity subtract and produce no net magnetomotive force or MMF in the machine. As the firing angle decreases in FIG. 13, the leading edge of the machine current pulse 1301 at the end of the voltage wave advances. At the same time the trailing edge of the current pulse at the start of the voltage wave advances an equal amount. The fundamental component of the net current seen by the machine excitation may be calculated by Fourier analysis. The end of the current pulse 1301 relative to the cosine analyzing function is at ninety degrees minus $\alpha/2$, while the start of the pulse is at $\alpha/2$ minus thirty degrees.

The fundamental part of the net machine current is therefore $$\begin{aligned}
I &= KI_d \int_{\alpha/2-30}^{90-\alpha/2} \cos\theta \, d\theta \\
&= KI_d \{\sin(90 - \alpha/2) - \sin(\alpha/2 - 30)\} \\
&= KI_d/2 \{3\cos(\alpha/2) - \sqrt{3} \sin(\alpha/2)\}
\end{aligned} \tag{7}$$

where K is some constant.

The total machine power $P_1$ is 3EI. At an $\alpha$ of sixty degrees, regular operation is resumed and, as Schaefer shows, the total power $P_1$ equals $P_{do}$ the power delivered to the output with no phase retard. Total power during the new mode of operation must be proportional to the current shown in equation 7 at angle $\alpha$ and the value of equation 7 at 60 degrees.

$$P_1 = P_{do} \frac{KI_d/2\{3\cos(\alpha/2) - \sqrt{3} \sin(\alpha/2)\}}{KI_d/2\{3\cos(30) - \sqrt{3} \sin(30)\}} \tag{8}$$

$$= P_{do} \frac{\{3\cos(\alpha/2) - \sqrt{3} \sin(\alpha/2)\}}{3\sqrt{3}/2 - \sqrt{3}/2} \tag{9}$$

$$= P_{do} \frac{\{3\cos(\alpha/2) - \sqrt{3} \sin(\alpha/2)\}}{\sqrt{3}} \tag{10}$$

$$= P_{do} \{\sqrt{3} \cos(\alpha/2) - \sin(\alpha/2)\} \tag{11}$$

The real machine power, neglecting losses, must equal the load system power which in turn is proportional to the output voltage which was previously shown in equation (4) to be:

$$E_d = \frac{E^3(2x^3)^{\frac{1}{2}}}{2\pi} \int_{120-\alpha}^{0} \sin\theta\, d\theta \qquad (12)$$

$$= E_{do}\{1 - \cos(120 - \alpha)\}$$

$$= E_{do}\{1 - \sin(\alpha - 30)\}$$

With expressions for both total and real power as a function of the control angle $\alpha$ now available, the reactive power can be found by taking the square root of the total power squared less the real power squared.

$$P_x = (P_t^2 - P_r^2)^{\frac{1}{2}} \qquad (13)$$

$$= P_{do}\sqrt{\{[\sqrt{3}\cos(\alpha/2) - \sin(\alpha/2)]^2 - [1 - \sin(\alpha - 30)]^2\}}$$

The results of substituting various values of $\alpha$ into equations (12) and (13) are plotted in FIG. 12 along with Schaefer's FIG. 1 circuit results.

Figure 14:
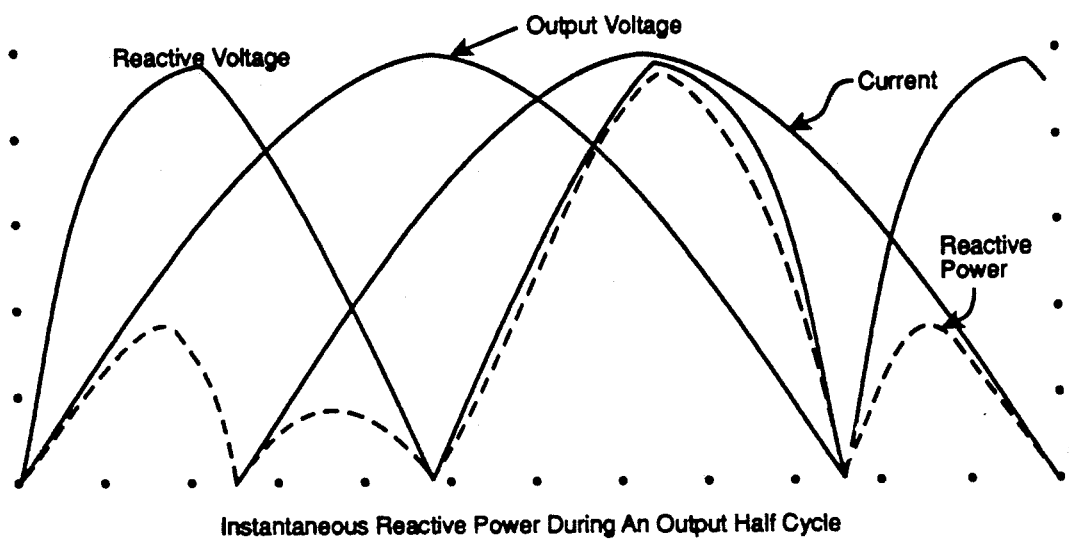
FIG. 14 shows a rearrangement of the FIG. 12 reactive power to show the relationship between output voltage and reactive power.

To compute the machine displacement power factor for a sinusoidal output wave, the FIG. 12 results are replotted as a function of the output voltage wave in FIG. 14. This FIG. 14 function is multiplied by output current to obtain the instantaneous reactive power over a half cycle of the output wave. Using Von Issendorf's method, the total refractive power is found by integrating the reactive power for a half cycle of the output and then the displacement power factor is calculated using equation (6).

$$P_f = P_r/(P_t^2 - P_x^2)^{\frac{1}{2}} \qquad (6)$$

Figure 15:
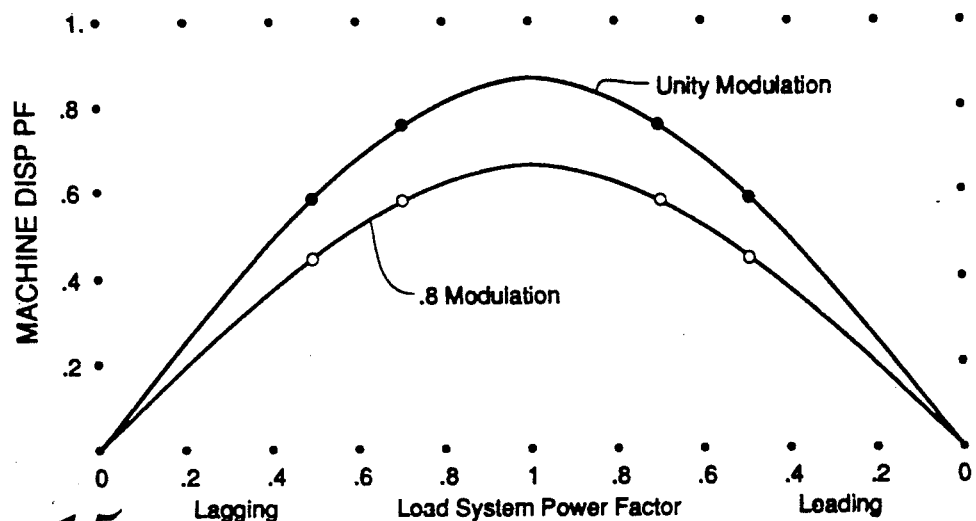
FIG. 15 shows the relationship between machine displacement power factor and load system power factor for a FIG. 2 type of cycloconverter waveform.

This integration may be performed numerically for unity and 0.8 modulations and for load system power factors of 1.0, 0.707 and 0.5 for the FIG. 2 operation. These results are disclosed in FIG. 15 and may be compared with the power factors shown in FIG. 11 for the conventional cycloconverter in order to appreciate the power factor improvement achieved with the FIG. 2 waveform. An improvement from 0.58 to 0.65 in machine displacement power factor with 0.8 lagging load system power factor and 0.8 modulation is demonstrated, for example, by a comparison of the FIG. 11 and FIG. 15 curves.

Notably for the FIG. 2 operation, the machine power factor may be higher than the load system power factor. This is possible because a part of the load current is invisible to the machine at low output voltage, since this current is either subtracted out electromagnetically in diametric phases for the FIG. 2 control.

Unity modulation is in fact practical with the use of turn-off switches. At the machine rating point of double load and 0.7 power factor, the machine displacement power factor is raised from 0.66 with the FIG. 1 conventional circuit to 0.72 with the FIG. 2 control. With natural commutation, the machine power factor is below 0.6 because of the reduced modulation required to insure computation.

ENGINE STARTING

To further clarify the invention and demonstrate some of the attending benefits, an aircraft starting system using a cycloconverter may be considered.

For aircraft engine systems wherein a single engine connected rotary electrical machine is used as an alternator during engine running and as a motor for engine start-up, the turn-off switches considered herein also provide added performance possibilities. In these systems the alternate-motor rotary electrical machine, i.e. "the machine" is usually provided with a wound rotor. During the starting cycle this rotor is energized with 400 Hertz ground power while the stator windings are energized with variable frequency alternating current energy in which the frequency and therefore the motor speed is increased as the starter engaged engine increases in speed. This variable frequency alternating current is often supplied from a cycloconverter.

Naturally commutated cycloconverters used for this purpose must advance the commutation point or the angle $\alpha$ for the current delivered to the starting machine when the machine frequency exceeds one-half of the supply system frequency of 400 Hertz for example, in order to provide for cycloconverter commutation—because the 400 Hertz source voltage does not always reverse when commutation is required. This advance reduces the machine output torque however, since torque is proportional to the cosine of the angle between the machine generated back voltage and the applied current.

With forced commutation, however, the current can be applied at the optimum angle with respect to the voltage so that even though the rotary electrical machine rating has been established by the system output requirements in the machine's generating mode, about the same starting performance is possible when the machine is actually smaller than would normally be required for starting use. Such improved starting performance is permitted by the use of turn-off switches.

Figure 16:
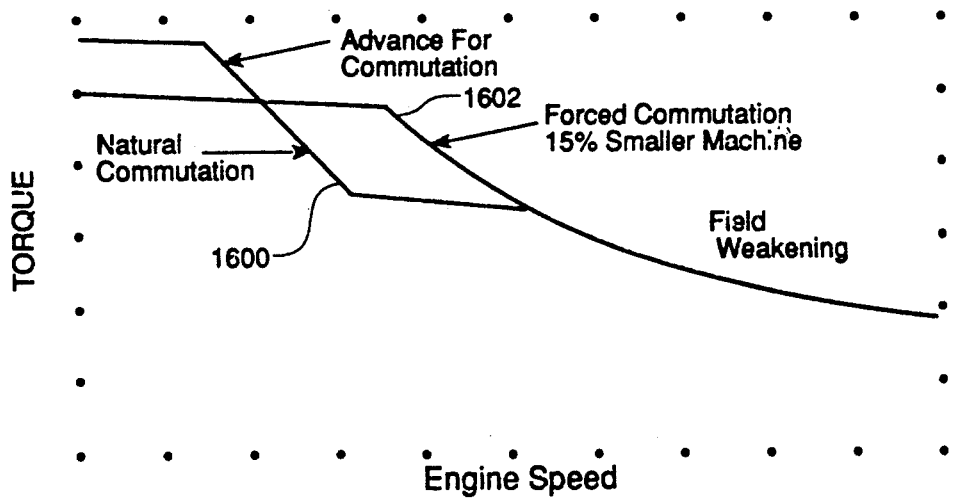
FIG. 16 shows a comparison of two motor characteristics using cycloconverter energization during an engine start cycle.

FIG. 16 shows at 1600 and 1602 starting motor characteristics for systems with natural and forced commutation where the systems have equal rating in the generate mode. The forced commutation system at 1602 is however, assumed to have a machine with about 15% less generated voltage capability, since with forced commutation, the systems can have equal rating even though the machine of the forced commutation system is smaller.

In the FIG. 16 machines, there is less torque at the beginning of the start cycle with the forced commutation of curve 1602 because of the assumed smaller machine. However, since angle $\alpha$ advance for commutation is not required, the torque delivered by the smaller machine is not diminished by a commutation requirement and the torque from the forced commutation system remains high and is in fact higher than the natural commutation machine's torque in the engine speed region before ignition—at the center of FIG. 16, when the opposing compressor torque from the engine is high. Use of the FIG. 2 control scheme in the starting machine energy supply is also advantageous early in the start mode, as it improves the normally very low power factor seen by the energy source while the engine speed and machine voltage are low. The lower waveform ripple this method allows also improves source machine and starting machine performances.

CONTROL CIRCUITRY

The electrical circuitry used to control the turn-on and turn-off commutating switches of the present invention and achieve the waveforms of FIG. 2 is somewhat dependent upon the electrical characteristics of the switches used. Switch control electrode signal level requirements, accommodation of switch forward and reverse blocking characteristics, transient signal effects, turn-on and turn-off delay characteristics, input and output frequencies and their ratio, and the number of input and output Phases to be used, are considerations to be addressed in the arrangement of these control circuits. Detection of the waveform crossover reference point 112 and consistent measurements of the angle α in the presence of varying input waveform frequency are included parts of this circuit arrangement; techniques which accomplish these functions are well known in the electrical art. The waveform details presented in FIGS. 2–4 herein and the other descriptive material in this disclosure, particularly paragraphs relating to the arrows 214 and 216 in FIG. 2 are collectively believed to place the complete design of these control circuits within the capabilities of persons skilled in the electronic circuit art without undue experimentation.

CONCLUSIONS

Power switches with turn-off capability permit a substantial reduction in cycloconverter source energy machine ratings and a modest reduction in the output waveform filter of the conventional cycloconverter. The herein disclosed control method which uses turn-off switches provides a reduction of machine and filter capabilities at the expense of a moderate increase in control complexity but without change of the basic power circuit. Moreover, the improvements in output waveform ripple content, IPT volt-seconds, and source machine power factor are achieved herein are equally applicable to AC and DC. output systems. Turn-off switches also eliminate or greatly reduce power circuit miscommutations because of random noise or load transients. This is psychologically important in many systems even if miscommutation causes no problem other than supply line transients or light blinking.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. The method for achieving improved source machine power factor and output energy waveform ripple from a power inverter commutating apparatus having on and off controllable switching elements and multiple-phased energy input waveforms from said source machine, said method comprising the steps of:
    segregating the commutation operation of said switching elements into a first operating mode for generating input waveform samples contributing to large amplitude portions of said output waveform and a second operating mode for generating input waveform samples contributing to small amplitude portions of said output waveform;
    selecting first operating mode commutation samples from said multiple phased input waveforms in the sequence of each phase sample being succeeded by a sample from the next lagging input phase, for fabricating said output waveform large amplitude portions; and
    choosing second operating mode commutation samples from said multiple phased input waveforms in the sequence of each phase sample being succeeded by a sample from the next leading input phase for fabricating said output waveform small amplitude portions.

2. The method of claim 1 wherein said energy input waveforms are sinusoidal in nature.

3. The method of claim 1 wherein said fabricating of output waveform portions include summing the waveform areas enclosed by said first and second mode communication samples into one of:
    a direct current output waveform, and
    an alternating current waveform of predetermined waveform configuration.

4. The method of claim 2 wherein said summing includes electrical wave filtering.

5. The method of claim 1 wherein said small amplitude portions of said output waveform and said large amplitude portions of said output waveform are portions smaller and greater than one-half of the peak amplitude of said output waveform, respectively.

6. The method of claim 1 wherein said power converter apparatus is a three-phase input to single-phase output inverter.

7. The method of claim 1 wherein said power converter apparatus is a three-phase input to direct current output system.

8. The method of claim 1 wherein said power converter includes a selected one of three-phase, six-phase, and twelve-phase input waveforms and a selected one of single phase, three-phase, six-phase and direct current output waveforms.

9. The method of claim 8 wherein said input waveform is of at least three times the frequency of said output waveform.

10. The method of claim 1 wherein said on and off controllable commutation switching elements are metal oxide semiconductor thyristors.

11. The method of claim 1 wherein said step of selecting first operating mode commutation samples includes changing a commutation switch for one of said next leading input phase and said next lagging input phase from a conducting state into a non-conducting state with a switch control electrode received commutating signal.

12. The method for operating a three-phase, sinusoidal input waveform sampling, and sinusoidal output waveform capable electrical energy converting switching circuit comprising the steps of:
    generating peak and large amplitude portions of a converter output waveform from a plurality of input sinusoidal waveform samples, each sample being bounded by an input phase to input phase waveform commutating event on one sample edge and by a segment of one input waveform sinusoid on an opposed edge thereof; and
    forming smaller amplitude portions of said output waveform from a plurality of input sinusoid waveform samples, each sample being bounded by a first input phase to second input phase waveform commutating event on one sample edge and by waveform portions selectable from said second input phase and a contiguous third input phase on an opposed edge thereof.

13. The method of claim 12 further including the step of filtering said converter output waveform to achieve said sinusoidal output waveform.

14. The method of claim 12 wherein said input waveform sinusoidal samples include positive area portions and negative area portions which are greater and smaller in amplitude respectively than the output amplitude waveform from said energy converting switching circuit.

15. The method of claim 14 wherein the relative enclosed area of said positive area and negative area sample portions and thereby the output of said switching circuit are determined by moving the location of said phase-to-phase commutating events with respect to said input sinusoid waveform.

16. The method of claim 12 wherein said large and smaller amplitude portions of said output waveform are portions greater and smaller respectively than one-half of said peak output amplitude.

17. An output waveform composition for a three-phased sinusoidal input energized electrical energy converter, said output waveform comprising:
a plurality of first waveshaped positive polarity samples of said input sinusoid waveforms, said first waveshaped samples each having a first input phase to second input phase commutating event disposed on a leading edge waveform side thereof and a segment of said second input sinusoid waveform disposed along a trailing edge waveform side thereof, said first waveshaped waveform samples being components of larger amplitude portions of said switching circuit output waveform;
a plurality of second waveshaped negative polarity samples of said input sinusoid waveforms, said second waveshaped samples each being disposed between adjacent positive polarity waveform samples and each having a segment of said same second input sinusoid waveform disposed along a leading edge waveform side thereof and a second to third input phase to input phase waveform commutating event disposed on a trailing edge waveform side thereof, said second waveshaped waveform samples also being components of larger amplitude portions of said switching circuit output waveform;
a plurality of third waveshaped positive polarity samples of said input sinusoid waveforms, said third waveshaped samples each having a first input phase to second input phase waveform commutating event disposed on a leading edge waveform side thereof and a segment of said second input phase sinusoid waveform disposed along a trailing edge waveform side thereof, said third waveshaped samples being components of smaller amplitude portions of said switching circuit output waveform; and
a plurality of fourth waveshaped negative polarity samples of said input sinusoid waveforms, said fourth waveshaped samples each being disposed between adjacent of said third waveshaped positive polarity waveform samples and each having a segment of said second input phase sinusoid waveform disposed along a leading edge waveform side thereof and an output amplitude selectable portion of said third input phase sinusoidal waveform, disposed along a trailing edge waveform side thereof, said fourth waveshaped waveform samples being components of smaller amplitude portions of said switching circuit output waveform.

18. The output waveform of claim 17 wherein the area ratios between a first waveshaped and second waveshaped successive positive and negative polarity sample and between a third waveshaped and fourth waveshaped successive positive and negative polarity sample, and thereby the magnitude of said output waveform, is controlled by varying the timewise location of said first input phase to second input phase waveform commutating events along said input sinusoids.

19. The output waveform of claim 17 wherein a combination of said first and second waveshaped waveform samples and a combination of said third and fourth waveshaped waveform samples are selected for composing said output waveform in response to output waveform amplitudes below and above one-half of an output peak amplitude, respectively;
whereby improved energizing machine power factor and improved low amplitude output waveform ripple are achieved in comparison with utilization of said first waveshaped samples in both said larger and smaller amplitude portions of said output.

20. The output waveform of claim 17 further including successive of said first and third waveshaped positive polarity samples comprised of leading edge third input phase to first input phase and second to third input phase commutating events.

* * * * *

UNITED STATES PATENT AND TRADEMARK OFFICE
CERTIFICATE OF CORRECTION

PATENT NO. : 5,198,972
DATED : March 30, 1993
INVENTOR(S) : David L. Lafuze

It is certified that error appears in the above-identified patent and that said Letters Patent is hereby corrected as shown below:

Column 2, line 53, "Phase" should not be capitalized.

Column 7, line 3, --PHASE-- should follow "NORMAL".

Column 8, line 54, "form" should be deleted.

Column 10, lines 50-51, "Previously" should not be capitalized.

Column 10, line 66, "Proportional" should not be capitalized.

Column 13, line 15, "is" should be --as--.

Column 13, line 59, "$P_2$" should be --$P_{x^2}$--.

Column 15, line 59, "computation" should be --commutation--.

Column 16, line 1, "alternate" should be --alternator--.

Column 17, line 3, "Phases" should not be capitalized.

Column 17, line 30, the first period should be deleted.

Column 17, line 46, "inverter" should be --converter--.

Signed and Sealed this

Eleventh Day of January, 1994

Attest:

BRUCE LEHMAN

*Attesting Officer*       Commissioner of Patents and Trademarks